United States Patent [19]

Hiramatsu et al.

[11] 4,290,165
[45] Sep. 22, 1981

[54] COLLECTING APPARATUS

[75] Inventors: Kenzo Hiramatsu, Hoya; Fumihiko Aiyama, Musashino, both of Japan

[73] Assignee: Kioritz Corporation, Japan

[21] Appl. No.: 120,600

[22] Filed: Feb. 12, 1980

[30] Foreign Application Priority Data

Aug. 13, 1979 [JP] Japan ............... 54-110473[U]

[51] Int. Cl.³ .................................................. A47L 5/18
[52] U.S. Cl. ........................................ 15/330; 15/405; 15/409
[58] Field of Search ............... 15/409, 405, 330, 408; 417/86, 151

[56] References Cited

U.S. PATENT DOCUMENTS

| 41,158 | 1/1864 | Lansdell | 417/151 |
| 1,040,641 | 10/1912 | Coyle | 15/409 X |
| 1,078,512 | 11/1913 | Mills | 15/330 |
| 1,317,693 | 10/1919 | Flannery et al. | 15/409X |
| 2,143,296 | 1/1939 | Beeman | 15/330 |

FOREIGN PATENT DOCUMENTS 1044111 9/1966 United Kingdom ............... 15/409

*Primary Examiner*—Chris K. Moore
*Attorney, Agent, or Firm*—Karl W. Flocks

[57] ABSTRACT

A collecting apparatus having a nozzle through which air is released to form a jet flow, a restriction provided at a position spaced from the nozzle in the direction of the jet flow and a vacuum sleeve defining a large vacuum space between the nozzle and the restriction. A collecting tube is connected to the vacuum sleeve to open to the vacuum space. A high vacuum is established in the vacuum space so that large dusts are sucked through the collecting tube and collected in a collecting bag attached to the restriction or scattered through the restriction.

4 Claims, 7 Drawing Figures

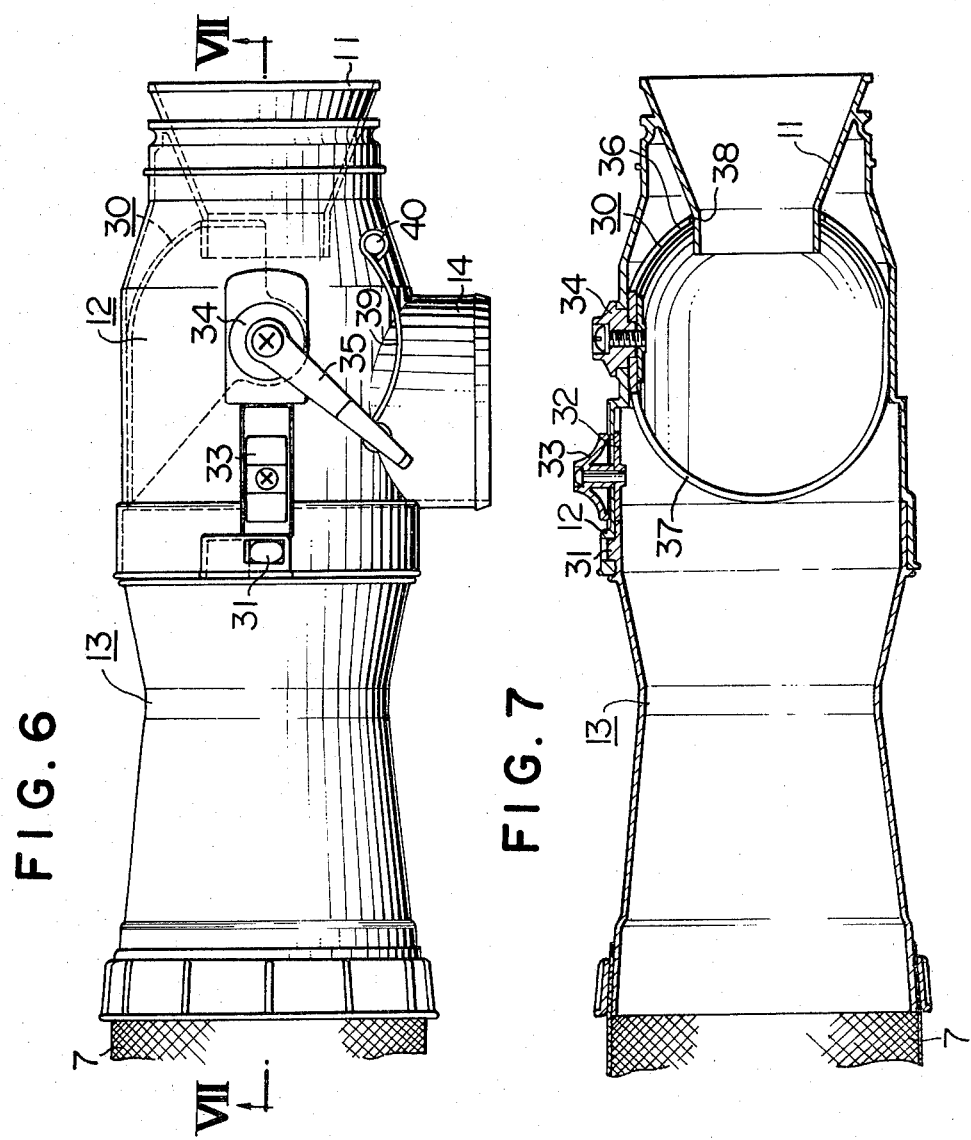

COLLECTING APPARATUS

BACKGROUND OF THE INVENTION

The present invention relates to a novel collecting apparatus and, more particularly, to an apparatus which can perform, making use of flow of air, both of collection and scattering of various objects.

The collecting apparatus of the invention finds wide use in domestic or household works, agriculture, gardening, light civil engineering and so forth. For instance, the collecting apparatus of the invention can suitably be used in household works such as gathering and collection of fallen leaves and large dusts. Also, in the field of agriculture and gardening, the apparatus of the invention can be used for collection of fruits and scattering of seeds and fertilizer. In the light civil engineering, the scattering of gravel, soil hardening agent and so forth can be achieved making use of the apparatus of the invention.

The collecting apparatus of the invention has a valve for switching the internal air passsage. Namely, the collecting apparatus of the invention can be used, by a switching of the air passage by the valve, also as an air sweeper for blowing to gather or scatter dusts, snow and so forth. Thus, the collecting apparatus of the invention can suitably be used for cleaning of a wide playground, baseball ground or the like, snow removal and for scattering standing water.

The collecting apparatus of the invention can advantageously be used such that it works first as an air sweeper for gather large dusts and then as a vacuum dust collector for cleaning corners or narrow areas where the air sweeper cannot operate.

SUMMARY OF THE INVENTION

It is an object of the invention to provide a collecting apparatus having an increased volume of a cylindrical vacuum sleeve for generating the sucking force to exhibit a large collecting capacity even for large solid matters.

To this end, a large vacuum space is formed between the nozzle and the restriction, and a collecting tube is connected to this vacuum space to make it easy to accumulate large sucked matters in a collecting bag or at a designated space and to scatter the same, thus facilitating the collection and transfer of soild matters.

In addition, since the vacuum sleeve has a simple cylindrical form, it is possible to produce economical and efficient collecting apparatus suitable for use in household works.

Another object of the invention is to provide a collecting apparatus having a double role of air sweeping and dust collection.

BRIEF DESCRIPTION OF THE DRAWINGS

FIG. 6 is a plan view of an essential part of collecting apparatus which is another embodiment of the invention; and FIG. 7 is a sectional view taken along the line VII—VII of FIG. 6.

DESCRIPTION OF THE PREFERRED EMBODIMENTS

Figure 1:
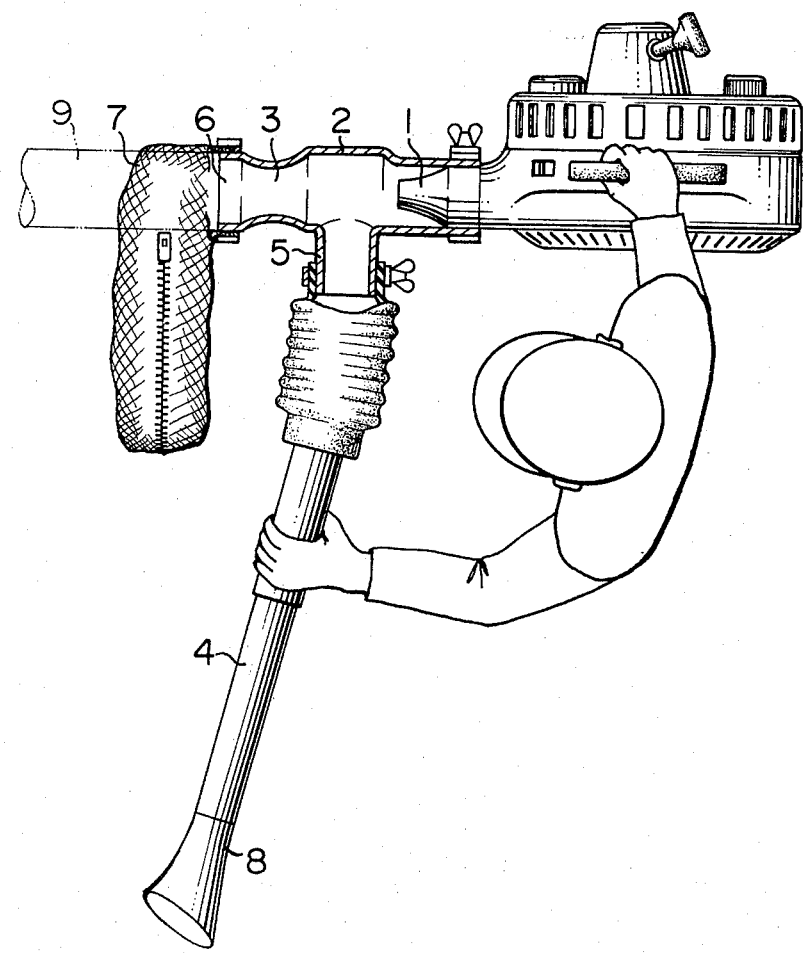
FIG. 1 is a plan view of a hand-carried type collecting apparatus constructed in accordance with an embodiment of the invention in the state of use.
Figure 2:
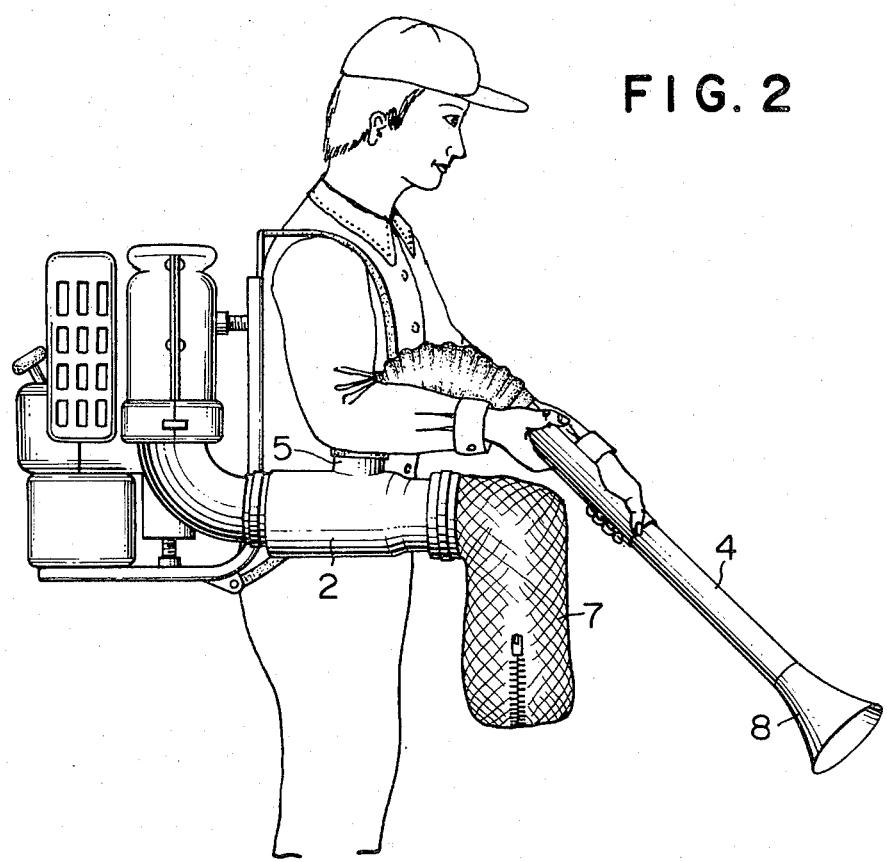
FIG. 2 is a side elevational view of a back-carrying type collecting apparatus which is a modification of the apparatus shown in FIG. 1.

FIGS. 1 and 2 generally show, respectively, a hand-carried type collecting apparatus constructed in accordance with an embodiment of the invention and a back-carrying type apparatus which is a modification.

Referring to these Figures, each apparatus has a blower unit including a centrifugal blower and an engine directly connected to the blower to drive the latter. The blower driven by the engine induces air and the air is released from a nozzle 1 to form a jet flow of air. In the hand-carried collecting apparatus, the blower unit is designed and constructed for easy transportion by hand, whereas, in the back-carrying type apparatus, the blower unit is adapted to be carried by the user's back.

The collecting apparatus has a vacuum sleeve 2 connected at its one end to the nozzle 1 of the blower unit. The vacuum sleeve 2 is provided at its other end with a restriction 3 which is effective in establishing a vacuum in the vacuum sleeve. The vacuum sleeve 2 is further provided at its intermediate portion between the nozzle 1 and the restriction 3 with a cylindrical hub 5 for attaching a collecting tube 4. Also, a collecting bag 7 is attached to the discharge or outlet port 6 of the restriction 3, as will be understood from FIG. 3.

Figure 3:
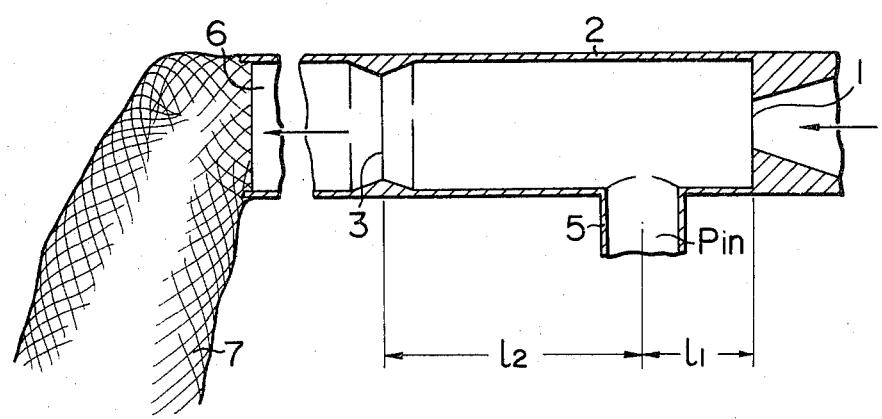
FIG. 3 is an illustration of a cylindrical vacuum chamber.
Figure 4:
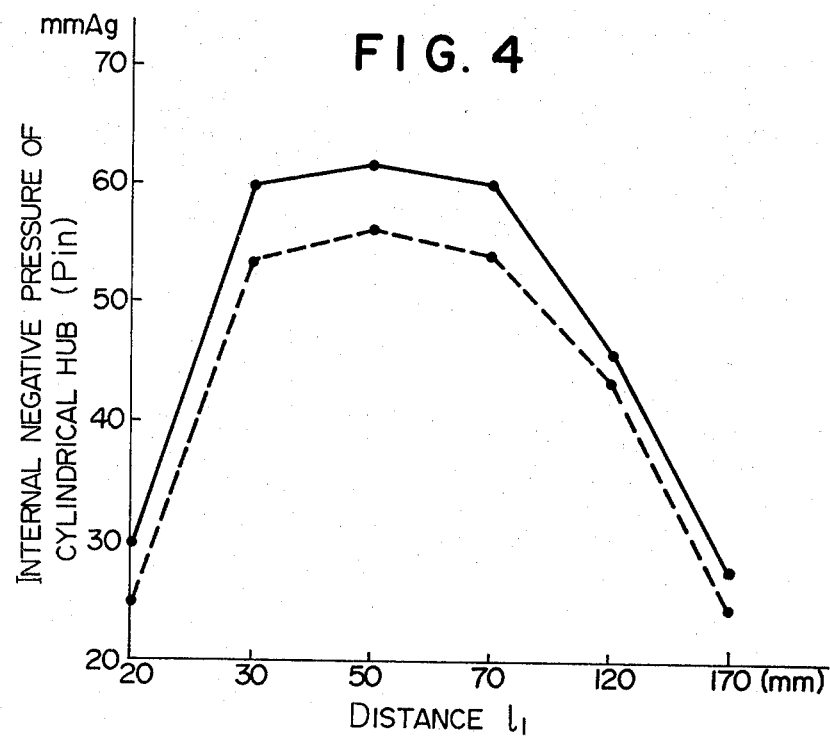
FIG. 4 is a graph showing how the negative pressure in a cylindrical hub is changed by the position of attaching of the cylindrical hub.
Figure 5:
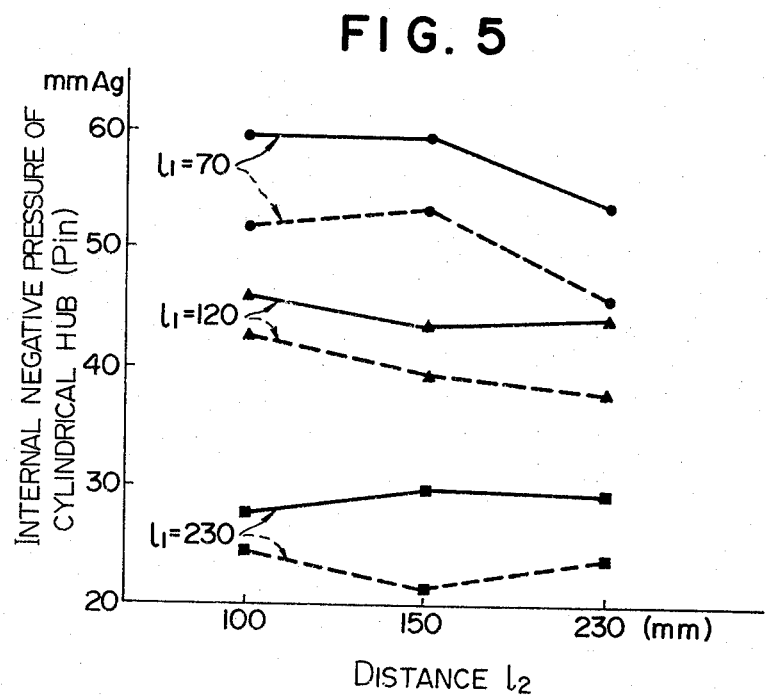
FIG. 5 is a graph showing how the negative pressure in the cylindrical hub is changed by the position of a restriction.

FIG. 3 is an illustration of the function of the vacuum sleeve 2. Representing the distance of the axis of the collecting tube 4 from the nozzle 1 and from the restriction 3 by $l_1$ and $l_2$, respectively, the vacuum Pin in the hub 5 for attaching the collecting tube 4 is changed as the distances $l_1$ and $l_2$ are changed, in a manner as shown in FIGS. 4 and 5. Judging from the graphs in FIGS. 4 and 5, it is considered that a good effect is obtained when the distances are selected such that the ratio $l_2/l_1$ falls within the range of between 1.5 and 2.0. The data shown in these graphs were obtained with a blower unit having a discharge rate of 6.16 m³ per minute. The diameters of the nozzle 1, restriction 3 and the vacuum sleeve 2 are, respectively, 40 mm, 80 mm and 96 mm.

From FIG. 4, it will be noted that the internal negative pressure of the hub 5 is largely affected by the distance $l_1$ between the axis of the collecting tube 4 and the nozzle 1. More specifically, a high vacuum is established when the distance $l_1$ falls within a range of between 30 mm and 70 mm. Thus, the level of the vacuum established in the collecting tube 4 is largely changed in accordance with the position of the collecting tube 4 and also by the position of the restriction 3. It is also to be noted that the form of the vacuum sleeve 2 having no internal obstruction permits a large volume in the vacuum sleeve 2 and also a comparatively large diameter of the collecting tube 4, thereby to enable the collecting apparatus to collect comparatively large solid matters.

The broken-line curves in FIGS. 4 and 5 show the characteristics as obtained when the blower operates at a reduced discharge rate of 5.94 m³ per minute. It will be seen that substantially the same pattern of characteristic curves are obtained even when the blower is operated at different discharge rates.

FIGS. 6 and 7 show a collecting apparatus constructed in accordance with another embodiment of the invention. This embodiment is characterized in that a valve 30 for switching the flowing direction of the air flow is provided in the vacuum sleeve. More specifically, as will be understood from FIG. 6, a vacuum sleeve designated at 12 has a nozzle 11 formed unitarily at the right side end thereof. The nozzle 11 has a frustoconical portion which converges toward the left and has a cylindrical portion connected to the portion of minimum diameter thereof. Also, a restriction member 13 is detachably secured to the left-side end of the vacuum sleeve 12. More specifically, an annular rib 31 formed on the outer peripheral surface of the restriction member 13 at the right-side end portion of the latter fits a retaining member 32 provided on the left-side end portion of the vacuum sleeve 12. This retaining member 32 is attached to the vacuum sleeve 12 by a holding member 33 which in turn is fixed to the retaining member 32 by means of a screw. A holding member 34 holds the aforementioned valve 30 and is adapted to be rotated by a handle 35 together with the valve 30 so that the valve 30 is rotated to open and close the passage leading to the restriction member 13.

As will be seen from FIGS. 6 and 7, the valve 30 is so shaped as to have a spherical portion 36 facing the nozzle 11 and a cylindrical portion 37 facing the restriction member 13, the cylindrical portion 37 having a diameter substantially equal to the inside diameter of the vacuum sleeve 12. The spherical portion 36 therefore is partly cut away as at 38 to clear the nozzle 11, while the cylindrical portion 37 is obliquely cut at 45° so as not to interrupt the air flowing from the nozzle 11 to the restriction member 13 when the valve 30 is not used.

The handle 35 is provided with a projection (not shown) resiliently biased by a resilient member, while recesses 40 are formed at both ends portions of a guide member 39 on the vacuum sleeve 12. The positions of the recesses 40 are so selected that they receive the projection of the handle 35 when the latter is rotated to positions for opening and closing the valve 30 thereby to retain the valve 30 in these positions.

The collecting apparatus of the embodiment shown in FIGS. 1 and 2 operates in a manner described hereinunder. As the engine is started, the air is compressed by the blower unit and is relieved into the vacuum sleeve 2 through the nozzle 1. The air then blows through the restriction 3. The air in the vacuum sleeve 2 is induced and flows toward the outlet port 6 through the restriction 3. In consequence, the pressure in the vacuum sleeve 2 is lowered considerably to lower also the pressure in the collecting tube 4, so that the collecting tube 4 induces air from the outside. It is, therefore, possible to maintain the collecting power of the collecting tube 4 while preserving a constant vacuum in the vacuum sleeve 2. An attachment 8 is attached to the end of the collecting tube 4 spaced from sleeve 2, as may be readily seen in FIG. 1. It is possible to selectively use a plurality of attachments 8 having a horn shape or other suitable shape corresponding to the kind of matters to be collected. The solid matters taken through the opening of the attachment 8 is then introduced into the vacuum sleeve 2 through the collecting tube 4. Since no obstruction which would obstruct the flow of solid matters reside in the vacuum sleeve 2, the solid matters smoothly flow through the vacuum sleeve 2 into the collecting bag 7 through the restriction 3. Since the collecting bag 7 is air permeable, the air is released to the atmosphere leaving the solid matters in the collecting bag 7. The collecting bag 7 may be omitted. In such a case, the solid matters are released together with the air. It is thus possible to scatter or gather the solid matters collected by the collecting apparatus. It is also possible to connect a transfer pipe 9 to the collecting apparatus in place of the collecting bag 7. By so doing, it is possible to transfer the solid matters to a remote place for accumulation.

Referring now to the embodiment shown in FIGS. 6 and 7 having the valve 30, the flowing direction of the air in the collecting tube 14, can be reversed by changing the position of the valve 30. More specifically, the air jetted from the nozzle 11 acts in the same manner as that in the collecting apparatus shown in FIGS. 1 and 2, when the valve 30 takes a position shown in FIG. 6.

However, as the handle 35 is rotated counterclockwise as viewed in FIG. 6 to rotate the valve 30 to the position for closing the restricting member 13, the air jetted from the nozzle 11 is made to flow toward the collecting tube 14 and discharged from the latter. In this state, it is possible to use the collecting tube 14 as an air sweeping tube. It will thus be understood that the collecting apparatus of the invention can perform a double function of an air sweeper and a vacuum dust collector.

What is claimed is:

1. A hand-carried apparatus selectively operable as an air sweeper for blowing to gather or scatter seeds, dust, snow, or the like or as a suction device for collecting fruit, dirt, or other objects, said apparatus comprising in combination:
    a. a sleeve having an upstream end and a downstream end;
    b. a nozzle extending into said sleeve at the upstream end thereof, said nozzle being connected to means for supplying air under pressure thereto, which air in turn may be directed as a jet flow into said sleeve;
    c. a passage, including a restricted portion, extending from the downstream end of said sleeve;
    d. a tubular member intersecting said sleeve at one side thereof and communicating with the space inside said sleeve;
    e. valve means disposed within said sleeve adjacent said nozzle and being selectively switchable to a position for permitting said jet flow to pass through said passage and restricted portion to effect vacuum condition in said sleeve and to another position for deflecting said jet flow to pass directly into and through said tubular member to effect a blowing condition at the end of said tubular member spaced from said sleeve.

2. A collecting apparatus as claimed in claim 1, characterized by further comprising a collecting bag attached to the outlet side of said restricted portion.

3. A collecting apparatus as claimed in claim 1, characterized by further comprising a horn-shaped attachment for collecting, scattering and transfer, detachably secured to the outlet side of said restricted portion.

4. A collecting apparatus as claimed in claim 1, characterized by further comprising a horn-shaped attachment for collecting, scattering and transfer, detachably secured to the end of said tubular member spaced from said sleeve.

* * * * *